July 1, 1930.  T. L. FAWICK  1,768,589
TUBE FORMING METHOD AND MEANS
Filed Oct. 3, 1927  4 Sheets-Sheet 3
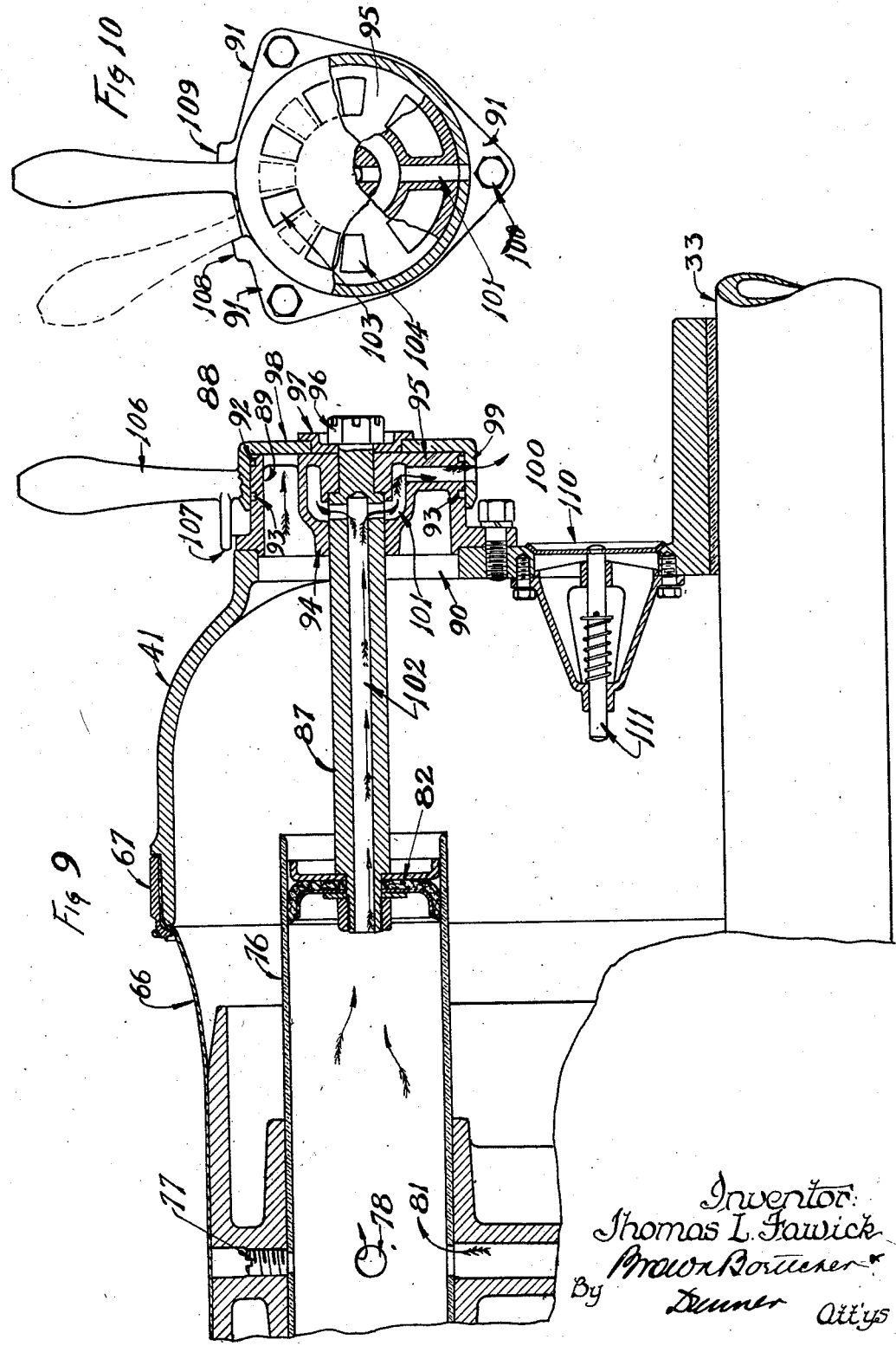

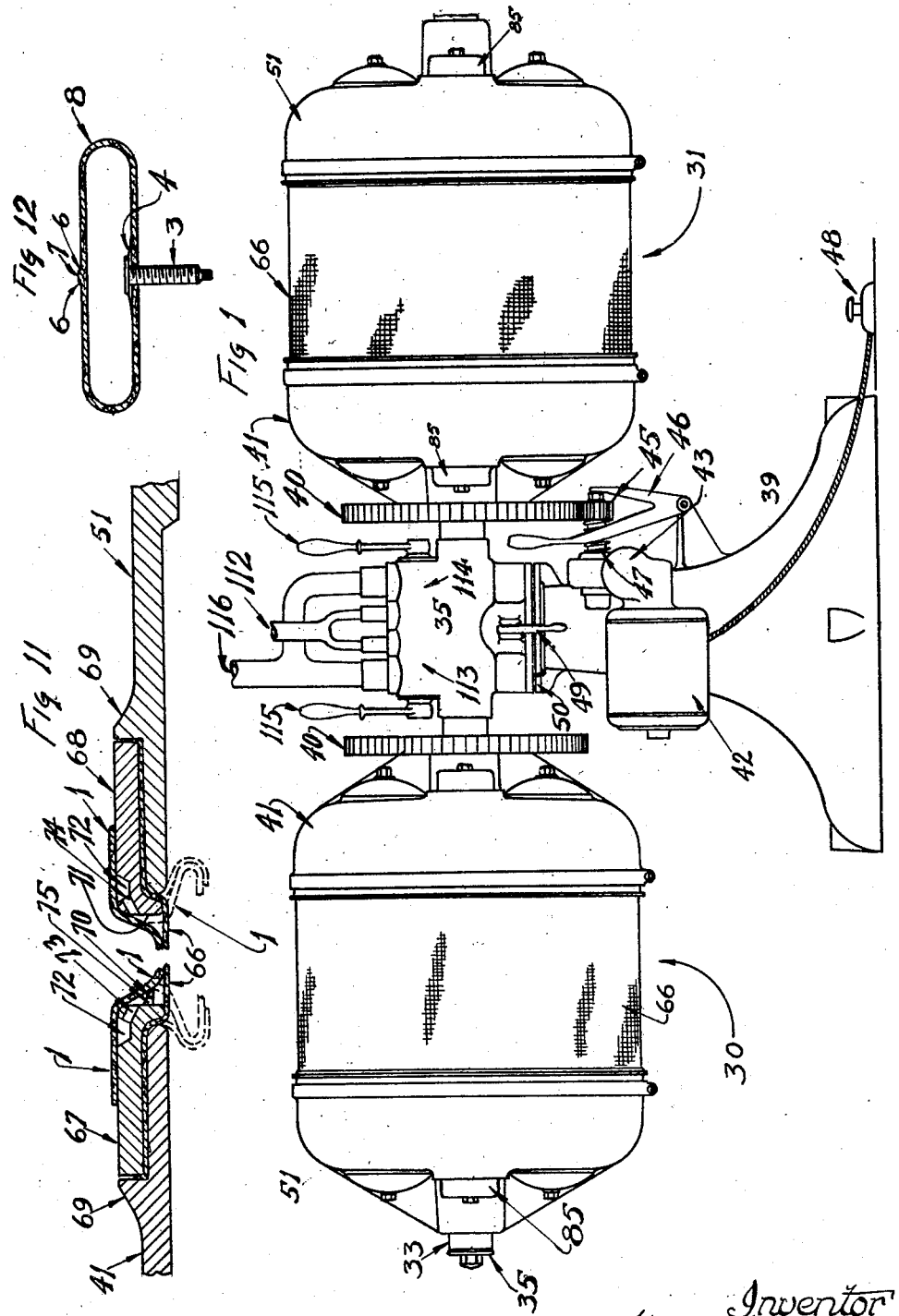

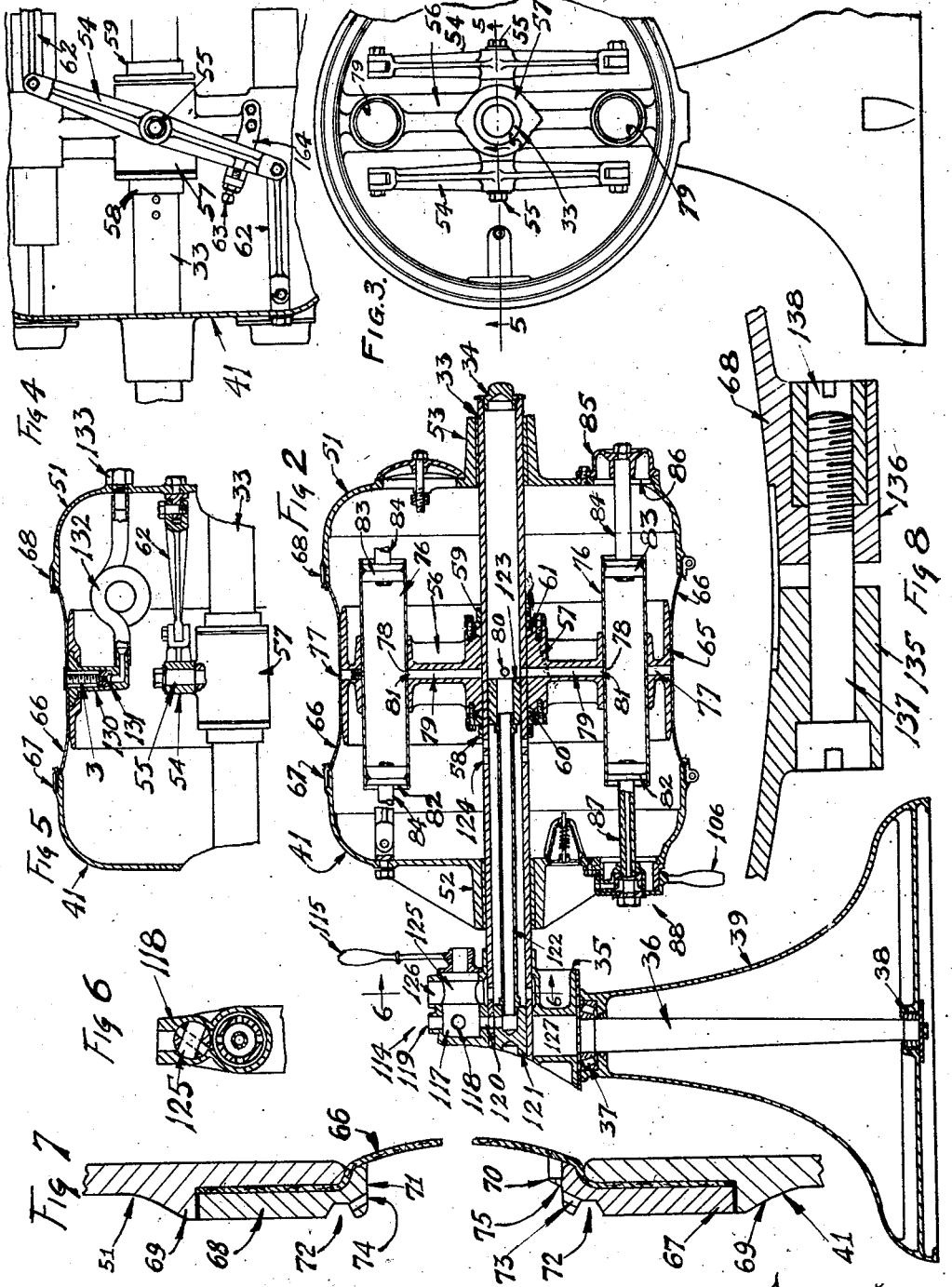

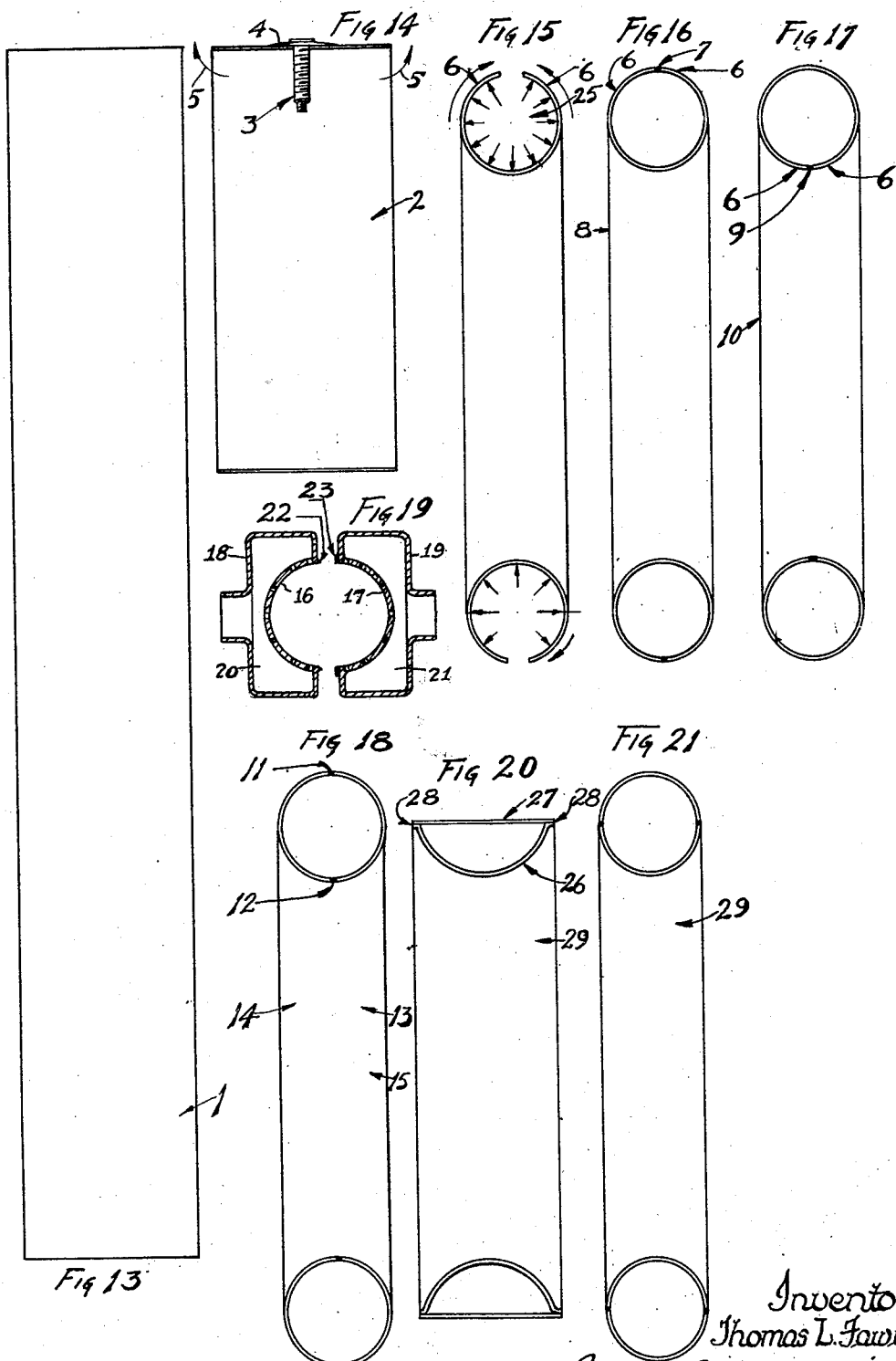

Patented July 1, 1930

1,768,589

UNITED STATES PATENT OFFICE

THOMAS L. FAWICK, OF RACINE, WISCONSIN

TUBE-FORMING METHOD AND MEANS

Application filed October 3, 1927. Serial No. 223,528.

My invention provides a method of and means for forming inner tubes for tires and the like. Incidentally, it teaches the art how to make other hollow articles from sheets of rubber or other elastic or plastic material. According to one method now employed in making inner tubes, these tubes are made by rolling a sheet of rubber upon a cylindrical mandrel in one or more thicknesses and then curing the cylindrical tube which is thus formed. Thereafter, the ends are joined to form an approximately toroidal tube. There are other methods for forming inner tubes, as by helically wrapping upon curved mandrels and curing in so-called watch case moulds to a torodial form. All the prior modes of forming inner tubes with which I am familiar, proceed upon the theory of making upon a suitable mandrel an open cylinder, either curved or straight, and thereafter joining the open ends and curing to the desired form, either before or after joining the ends. All of these methods involve a large amount of skilled manual labor which entails a high cost of production.

According to my invention, I form an endless tube by means of an external mandrel or mold holding the sheet rubber to the form of said external mandrel or mold by a fluid pressure difference. The method of my invention is not confined to the manufacture of endless tubes, as the same mode of operation, i. e., providing an external mold and holding the sheet or sheets to the form of the mold or parts of the mold by fluid pressure difference until the edges are joined, is, so far as I am aware, fundamentally new.

Based on this principle of operation, I have devised a machine and a specific method of operation which will now be explained in detail, in order to acquaint those skilled in the art with the manner of constructing a machine embodying my invention and practicing the novel method.

In the accompanying drawings:—

Fig. 1 is a side elevational view of a complete machine embodying my invention;

Fig. 2 is a vertical section of one-half of the machine and the base, showing the mode of operation of the parts;

Fig. 3 is an end view of the machine shown in Fig. 1, with one of the end plates removed;

Fig. 4 is a fragmentary section taken on the line 4—4 of Fig. 3 showing the equalizing connection between the caps or plungers;

Fig. 5 is a radial section through the machine taken on the line 5—5 of Fig. 3 showing the inlet connection to the valve for the inner tube;

Fig. 6 is a section taken on the line 6—6 of Fig. 2, showing the valve structure;

Fig. 7 is a fragmentary sectional view of a supporting web and closing jaws mounted in a vertical direction;

Fig. 8 shows the manner of joining the ends of the circumferential bands forming the joining and cutting jaws;

Fig. 9 is an enlarged sectional view of the release valve shown in less detail in Fig. 2;

Fig. 10 is an end view, partly in section, of said release valve;

Fig. 11 is a fragmentary section showing the manner of applying the raw sheet and the manner in which the sheet is then formed to permit the joining and cutting jaws to operate;

Fig. 12 is a cross-sectional view of the completed tube; and

Figs. 13 to 21, inclusive, are diagrams to assist in an explanation of the invention.

Referring first to the explanatory diagrams, I shall explain the theory of operation in forming a closed toroidal tube.

Fig. 13 shows, in elevation, a strip of raw rubber suitable in length to form the body of the finished tube. In length it is approximately equal to the mean circumference of the finished tube, or it may be equal to the maximum peripheral circumference of the tube, if a single layer is employed or sufficiently long to provide several layers. This sheet or strip of raw rubber 1 is then formed into a continuous right cylinder, as shown in Fig. 14. This right cylinder 2, shown in Fig. 14, may be produced from a single thickness of the raw rubber sheet 1, or it may be laminated by employing two or more thicknesses of such sheet. The valve stem 3, with a suitable valve patch 4 attached thereto, may then be projected through the wall of the cylinder 2 to put said valve in place. This raw rubber sheet, as is well known to those skilled in the art, is very sticky, and as soon as it is touched together it adheres and immediately welds together like sticky fly paper.

The wall of the cylinder is now double curved, as indicated by the arrows 5, i. e., by a turning movement. This turning movement may be produced by depressing the center and moving the margins outwardly, by holding the margins and moving the center portion inwardly or outwardly, or by any such relative movement of the margins with respect to the body, as will serve to produce a relative radial motion of the margins with respect to the body and the bringing of the margins together to join them. In the preferred mode of operation, as herein specifically described, I prefer to draw in the central portion of the cylinder 2 and bring the margins outwardly and together, as indicated in Fig. 15, these margins 6—6 being then brought into contact and joined to form the joint as indicated at 7 in Fig. 16.

Theoretically, this mode of procedure in forming the sheet into a cylinder and then forming the cylinder into a toroidal ring or tube, can be performed by hand, but, obviously, the provision of other means for performing the same more quickly, expeditiously and accurately, is desirable, and I have therefore devised the machine and mechanism shown in Figs. 1 to 12, inclusive.

The fundamental concept of the mechanism shown in Figs. 1 to 12 is the provision of a mold which arrives at the proper double curved final form, and to the surface of which the raw rubber sheet is caused to adhere and held in place by suitable fluid pressure difference, in the present case suction.

While I employ a mold or form of double curved final shape, it is to be understood that the rubber sheet might be held to a form of any desired configuration, either single curved, double curved, or of any combination of forms or curvatures.

While I prefer to make the tube of a single sheet, either of a single thickness or of plural thickness, and join the edges of this sheet peripherally in a single seam, I do not wish to limit my claims or the teaching of my invention to this specific mode of procedure.

It is obvious that, instead of forming the tube by bringing the edges together outside of the main body of the sheet, the tube might be formed by bringing the edges together radially within the main body of the sheet, as indicated at 9 in Fig. 17, to form the completed tube 10.

Also, it will at once be apparent that the tube may be made with a plurality of joints or seams 11—12, as shown on the tube 13 of Fig. 18.

Whereas, in the formation of the tube 8 or 10, as shown in Fig. 16 and Fig. 17, the mold changes its shape in order to bring the margins together, i. e., it is a flexible mold, the mold may be made of two or more parts which are rigid but movable with respect to each other.

That is to say, the tube 13 may be made of the two halves 14 and 15, which halves may be formed in ring-shaped molds of the cross-section shown in Fig. 19. Circular flat rings may be laid in the grooved portions 16 and 17 of the molds 18 and 19 and held to the form of the same by suction in the trunks 20 and 21 communicated through a series of small openings through the walls of the molds 18 and 19. The margins of such rings may be pressed together and cut off between the jaws 22 and 23, the valve being introduced at the same time or later, as may be desired.

In the formation of the tube 8 or 10, as illustrated diagrammatically above, the sheet is held to the flexible mold by suction, as indicated by the arrows at 25 in Fig. 15, said arrows indicating the atmospheric pressure holding the walls against the sides of the mold as the parts are closed together.

I may also form the tube as diagrammatically illustrated in Fig. 20, out of two or more sheets, as, for example, by first forming the inner sheet 26 in the form of an annular trough or gutter, and then applying the outer sheet 27 in the form of a cylinder in contact with the margins of the gutter 26, these margins 28 being pressed together and cut as desired, and the resulting tube 29 being thereafter expanded to the form shown in Fig. 21.

The finished tube in raw rubber with the nipple applied, may then be placed in a suitable mold, as explained in my co-pending application, Serial No. 223,529, filed October 3, 1927, and cured in the mold to the desired size and configuration. It is possible when forming the tube, as indicated in Figs. 18 and 19, to cure the tube in the same mold in which it is formed.

Referring now to Figs. 1 to 12, I provide a duplex machine having a pair of molds or forming members 30 and 31 mounted on a horizontal axis and rotatable thereupon, said axis being a hollow shaft or tube 33 having its ends closed by suitable caps 34. The shaft 33 is, at its center, secured to a central frame member 35, and this central frame member 35 is supported for rotation in a horizontal plane on the vertical spindle 36 having suitable bearings 37 and 38 in the hollow base member 39.

Each mold member 30 and 31 is rotatable on the shaft 33 as by means of a suitable gear member 40—40 secured to the corresponding end or cap member 41—41 by rotating the corresponding unit. A small electric motor 42 is connected to the base 39 and through a double worm reduction 43—44 drives the pinion 45, which is relatively stationary and adapted to mesh with the gear 40 of the unit 31 which is in register therewith.

I have shown the pinion 45 as being axially slidable by means of the bell crank controlling lever 46 and spring 47. The operation of the motor 42 is preferably controlled by a foot switch 48 under the control of the operator who is stationed in front of the forming unit 31.

While a motor driven gear drive is shown, this drive may be modified to suit the commerce of the manufacturer. For example, a friction pulley bearing against the cap 41 and driven by a motor or any other source of power may be employed.

A suitable stop for stopping the motion of the unit on the vertical spindle 36 is provided as by means of the latch lever 49, which drops in a notch in the flange 50 at the upper end of the base or pedestal 39.

The operator, who is stationed before the unit 31, applies the rubber sheet 1 to the forming unit 31 and forms the tube, and then the unit 31 is swung to the opposite side, and while an attendant takes off the formed tube the operator applies a sheet to the unit 30, whereupon the unit 31 is swung back into position and the tube is removed from the unit 30 and so on.

The units 30 and 31 each comprise the inner caps 41 and outer caps 51, which, as will be described more in detail later, operate as pneumatic plungers. These caps have hubs 52 and 53 rotatable and slideable on the shaft 33. The caps are connected together by an equalizer bar 54 (see Fig. 4) which comprises a lever pivoted at its central portion on a pivot 55 mounted on a central spider frame 56. The spider frame 56 is rotatably mounted on the shaft 33 having a central hub 57 held against axial motion on the shaft 33 by the set collars 58 and 59, the ends of the hub 57 being sealed fluid tight against the surface of the shaft 33 by the packing glands 60 and 61.

The outer ends of the arms 54 are connected to links 62—62 by suitable pin joints and the opposite ends of said links 62—62 are in turn connected to the end caps 41 and 51, so that the two caps must move inwardly and outwardly with respect to the spider frame 56 in unison.

A suitable stop in the form of a set screw 63 mounted on a bracket 64 on one side of the spider frame 66 may be provided for limiting outward motion. This, however, is optional, as suitable stops may be formed on the shaft 33 to accomplish the same result. The spider frame member 56 comprises a transverse or diametrical bar, upon the outer end of which there is mounted a cylindrical support 65 which looks very much like a belt pulley. This cylinder 65 has its edges chamfered off, as is shown in Figs. 2 and 5, to prevent said edges from wearing the mat or web 66. The mat or web 66 is an elastic fabric, namely, a fabric embodying a series of fine strips of rubber, such as is employed in making elastic bandages, suspenders, garters and the like. This fabric is substantially inextensible longitudinally of the forming unit, but it is expansible and contractile circumferentially of the forming unit. However, as will be apparent to those skilled in the art, this mat may be flexible only and not necessarily elastic. It must be porous to permit suction to extend through it to pull the plastic rubber sheet to its form.

The edges of this mat or web 66 are secured to the margins of the caps 41 and 51 by means of split clamping rings 67 and 68, said split clamping rings being bound tightly upon the margins of the mat or web 66, which in turn embraces the margins of the cap members 41 and 51.

The outer edges of these split rings 67 and 68 abut against shoulders 69 to prevent endwise shifting of said rings. These rings 67 and 68, in addition to performing the function of binding the margins of the elastic mat or web, have another important function.

The ring 67 has a circular knife 70 which is adapted to bear against the face or cutting block 71 formed on the adjacent end of the ring 68. These rings therefore form closing jaws for closing the edges of the rubber sheet 1 together, and they serve also to cut off the excess margin beyond the joint.

Adjacent their opposing surfaces, the rings 67 and 68 have peripheral grooves 72—72, and these grooves communicate by way of ports 73 and 74 with the mat 66.

The circular knife 71 is pierced back of its cutting edge by a series of small ports 75 to permit the suction which exists inside of the forming unit and extends through the web or mat 66 to reach into the groove 72. Likewise, the ports 74 permit suction to extend into the groove 72 in the ring 68 for the purpose, as will be described further, of holding the margin of the sheet 1 upon the corresponding cylindrical surface of the ring 67 or ring 68.

It is to be understood that the mat or web 66 is of a sufficiently loose weave to permit air to pass therethrough relatively freely to form a suction mat for holding the sheet 1 thereupon as soon as it is laid upon the unit.

The spider frame 56 supports a pair of open ended cylinders 76—76 which are held in place by grub screws 77 lying in a drilled passageway extending diametrically through the cylinder 65 and the spider frame 56. The grub screws 77, in addition to holding the cylinders 76, serve to close the outer end of said drilled passageway to prevent the escape of compressed air which is admitted to said cylinders 76. The cylinders 76 communicate through a series of ports such as 78, with the drilled passageway 79, and through a series of ports 80 with the interior of the hollow shaft 33. The hub 57 is spaced away from the surface of the tube 33 to permit passage of compressed air about the same into communication with the drilled passageway 79. Likewise, there is a groove 81 formed on the inside of the cylindrical mounting for the cylinder 76 to permit the interior of the cylinder 76 to communicate with the drilled passageway 79 through the openings 78 which are disposed about the central part of the cylinder 76.

The cylinders 79 each contain a pair of pistons 82—83 connected by suitable piston rods to the caps 41 and 51.

The piston rods 84 for the upper cylinder, and the lower outer piston rod 84 of the lower cylinder, are connected to the respective caps 41 and 51 by small flanged cover plates 85 lying over openings 86 formed in the corresponding end walls of the cap members 41 and 51. The admission of compressed air into the cylinders 76 between the pistons 82 and 83 thereby tends to force outwardly the cap members 41 and 51 to their outermost positions.

The piston rod 87, shown at the lower left hand in Fig. 2 is hollow, and it leads to a manual control valve 88 shown in detail in Fig. 9 and 10. A cylindrical valve body member 89 is bolted over an opening 90 in the corresponding cap 41, as by means of the three lugs 91, the outer surface of the valve body member 89 being finished on a true cylinder and provided with the packing rings 92—93. A central hub member 94 is counterbored to receive the shouldered piston rod 87, the reduced end of the same passing through the flat end wall 95 of the valve body member 89 and being held by a nut 96 which clamps under it a flanged retaining plate 97. The flanged retaining plate 97 provides a bearing for the valve member 98 which is formed in the shape of a cap. The cylindrical portion 99 of the cap 98 has a radial opening 100 communicating with a passageway 101 which leads to the passageway 102 in the hollow rod 87. The passageway 102 in turn communicates with the interior of the cylinder 76.

The top or radial portion of the cap member 98 includes a series of ports 103 adapted to register with cooperating ports 104 formed in the upper part of the end wall 95. The valve cap 98 is provided with a suitable operating handle 106 for rotating the same, and the motion of this handle is limited by a finger 107 playing between two stops 108 and 109. The construction of this valve is such that the compressed air in the cylinders 76—76 which are in communication, may be exhausted out through the valve port 100 when said port is brought into register with the passageway 101. While the port 100 is in communication with passageway 101, the ports 103 may, at the same time, be brought into registration with a part of the ports 104 so that atmosphere may be freely admitted to the interior of the molding unit and to the interior of the pressure cylinders 76, so that no motion of the same can occur. Within the degree of motion provided for the valve member 98, the exhaust of compressed air may be closed off and the inlet of air into the interior of the unit regulated to a greater or less degree. By this means it is possible to regulate by hand the rate of opening and closing of the machine. A safety release valve 110 may be provided to prevent accumulation of any appreciable pressure above atmosphere within the units, and also the release valve 110 may be employed as the limit valve for preventing the application of undue pressure upon the jaws of the machine. For this purpose, the stem 111 is set to engage the spider frame member 56. The valve 110 is optional and may be omitted.

Compressed air is admitted to the interior of the hollow shaft 33 from a compressed air pipe 112 which is branched to lead to two valve units 113 and 114 which are identical. Each of said valve members is provided with a suitable operating handle 115 to control the admission of compressed air through the cylinders 76 from the pipe 112, or the admission of suction from pipe 116 to the interior of the molding or forming units 30 and 31.

The valve member 114 has a rotatable plug 117 comprising a passageway 118 adapted in one position of the handle 115 to be brought into register with a port 119 and a passageway 120 leading into communication with the interior of the plug member 121 which is disposed in the central part of the hollow shaft 33. A small tube 122 leads from the plug member 121 to another plug member 123, which is located beyond a series of openings 124 in the side walls of the hollow shaft 33. Thus, by bringing the passageway 118 in the valve body 117 into register with the compressed air inlet 119, compressed air may be admitted through the passageway 120 to the tube 122 and from thence to the interior of the hollow shaft 33 beyond the plug 123, the compressed air then passing into the interior of the cylinders 76 to drive the end members 41 and 51 outwardly away from each other to their limiting position.

The valve body 117 also contains a passageway 125 adapted to be brought into and out of register with the suction admission passageway 126, the lower end of which communicates through a series of openings 127 with the space between the tube 122 and the hollow shaft 33. Such may thus be extended to the interior of the unit through the passageways 124 previously referred to. The valve body 117 is arranged to cut off communication with both compressed air and suction, or to open communication at any time with the same for properly controlling the operation of the unit.

The operation of the device thus far described is as follows:—

Assuming that the parts are in the position shown in Fig. 1 and Fig. 2, a strip of rubber 1, such as shown in Fig. 13, direct from the calender roll is trained onto the unit 1 in the position indicated in Fig. 11 with the edges of the same overlapping on the bands 67 and 68. By means of the electric motor 42, the unit is rotated to wind the strip 1 one or more times onto the drum provided by said unit. The mat or web 66 is preferably set substantially into the position shown in Fig. 1 by the admission of a small amount of compressed air to the cylinders 76, although it is immaterial whether the same is strictly cylindrical or not; it may belly inwardly as shown in Figs. 2 and 5. After a complete cylinder of the raw uncured rubber has been wound upon the unit 31, the sheet is severed, as for example by a hot wire, knife or the like, and thereupon suction is admitted by operation of the valve 114 to the interior of the unit 31. The rubber ring, such as shown at 2 in Fig. 14, acts as a seal on the mat 66, although suction extends through the same readily and extends to the grooves 72 to hold the edges of the raw rubber sheet in place. Thereupon, compressed air is exhausted from the cylinders 76 as by means of the control valve 88, and suction being admitted to the interior of the unit, the mat, with the raw rubber sheet thereupon, is drawn inwardly to the limit imposed by the cylinder 65, the edges of the sheet being compelled to remain on the rings 67—68 by the suction which holds the same in place and by the mat which is secured under said clamping rings.

If it is desired to insert the valve stem, this is preferably done before starting to close the jaws of the machine. In Fig. 4 I have shown a tube 130 adapted to receive the valve stem 3 and to fit at its outer end into a chuck 131, which chuck communicates through a flexible tube 132 with an external fitting 133 in the end wall of the cap 51, for the purpose of blowing in air laden with soapstone, as will be explained later.

The valve stem 3 and its patch 4 are put in place, and then the jaws are closed by the action of suction within the unit until the knife 70 presses the adjacent margins of the sheet 1 together and causes them to adhere, and then cuts off the surplus which extends beyond said circular knife 70.

This leaves a complete tube 8 with the valve stem 3 and patch 4 in place, as shown in Fig. 12. The seam or union 7 of the margin 6—6 provides a small amount of surplus stock which insures an excellent joint during the curing process.

Due to the large area of the drum ends 41 and 51, a great amount of aggregate force is available for forcing together and trimming the edges of the formed tube.

Suction is then shut off and atmosphere is admitted, and compressed air may be admitted into the cylinders 76 to force the cap members 41 and 51 outwardly. At the same time the operator or an attendant, by means of a suitable hose and valve, blows a small amount of air laden with soapstone in through the fitting 133, tube 132 and valve stem 3 to dust the interior of the tube with soapstone.

While the jaws are opening, the unit 30 may be swung into place in front of the operator and an attendant removes the formed tube 8 by stripping the same over the end cap 51 and removing the valve stem 3 from its seat.

By this manner of operation tubes may be formed expeditionsly and in a highly satisfactory manner structurally. I have tested tubes made on my machine before and after they are cured, and I find that the familiar test of cutting a strip and then expanding the same until it breaks or tears, shows that the joint 7 is stronger than the main body of the tube, invariably.

The jaws may readily be renewed and the mat may also be renewed, said jaws being formed as split bands having clamping lugs 135 and 136, as shown in Fig. 8, with a clamping bolt 137 held by an expanding set screw 138.

It is obvious that the machine need not be made in duplex, as I have shown, and it is apparent to one skilled in the art that the specific embodiment which I have shown, may be widely varied without departing from the spirit and scope of my invention. The units 30 or 31 may be mounted vertically if desired, and the band of raw rubber formed in a vertical position.

It is apparent, also, that instead of drawing or blowing the body of the sheet 1 or ring 2 inwardly, it may be drawn or blown outwardly and the seam made on the inner periphery, as indicated in Fig. 17.

Likewise, instead of making a tube out of a single sheet with one joint or seam, the tube may be formed of rings, or a straight strip applied to two semicircular molds of the character which I have disclosed in connection with my machine, or rigid molds as shown in connection with Fig. 19, to form the seams 11 and 12 of the tube 15 shown in Fig. 18.

Also, instead of folding the edges over, as illustrated in Figs. 15 and 16, the machine of my invention may be employed to form a gutter-shaped portion 26 which may then be covered by a cylindrical portion 27, the edges 28 being pressed together and trimmed, and air thereafter introduced to form the tube as shown in Fig. 21.

While the forming machine which I have herein illustrated is adapted to form a given size of tube, other sizes may be made on the machine by the use of suitable interchangeable parts or by different lengths of the forms, mat or web 66.

Numerous other modifications and variations within the teaching of my invention will be apparent to those skilled in the art.

I claim:—

1. The method of forming an endless tube which comprises forming a strip of suitable material into a cylindrical ring, holding the margins of the ring and deflecting the central part of the ring radially, then holding the central part in deflected position and moving the margins together.

2. The method of forming an endless tube which comprises forming a strip of plastic material into a cylindrical ring, holding the margins of the ring at a substantially fixed radial distance, deflecting the central part of the ring between the margins radially and then joining the margins.

3. The method of forming an endless tube which comprises forming a strip of plastic material into a cylindrical ring, holding the margins of the ring against radial deflection and by difference in pneumatic pressure deflecting the central part of the ring radially, then pinching the margins together to form a seam and removing the margins beyond the seam.

4. In combination, a pair of circular die members adapted to receive the margins of a sheet of plastic material, means to create a fluid pressure difference on opposite sides of said sheet of material to cause the same to belly away from the margins, and means operated by said fluid pressure difference to bring said die members together.

5. In combination, a rotatable mold comprising a drum having heads movable axially towards and away from each other by a fluid pressure difference, and a flexible porous mat joining said heads.

In witness whereof, I hereunto subscribe my name this 30th day of September, A. D. 1927.

THOMAS L. FAWICK.